United States Patent [19]
González

[11] Patent Number: 4,685,779
[45] Date of Patent: Aug. 11, 1987

[54] COMBINED FORWARD AND REARWARD VIEWING MIRROR ASSEMBLY FOR AUTOMOTIVE VEHICLES

[75] Inventor: Sergio González, Garza García, Mexico

[73] Assignee: Kasos N.V., San Antonio, Tex.

[21] Appl. No.: 856,940

[22] Filed: Apr. 28, 1986

[51] Int. Cl.$^4$ ............................ G02B 7/18; B60R 1/10
[52] U.S. Cl. .................................. 350/604; 350/619; 350/623; 350/637; 350/603
[58] Field of Search ............... 350/604, 618, 619, 620, 350/623, 624, 637, 603

[56] References Cited

U.S. PATENT DOCUMENTS

| | | | |
|---|---|---|---|
| 1,666,236 | 4/1928 | Fuerth | 350/623 |
| 1,877,105 | 9/1932 | Wullenweber . | |
| 1,969,415 | 8/1934 | Ostroff . | |
| 2,132,026 | 10/1938 | Griffith | 350/623 |
| 2,191,558 | 2/1940 | Cooley . | |
| 2,302,952 | 11/1942 | Pfeifer | 350/623 |
| 2,374,956 | 5/1945 | Rubissow . | |
| 2,398,354 | 4/1946 | Brinkley . | |
| 2,607,273 | 8/1952 | Lark . | |
| 2,649,028 | 8/1953 | Lenta . | |
| 2,796,003 | 6/1957 | Kaufman | 350/623 |
| 2,818,778 | 1/1958 | Falciglia . | |
| 3,644,021 | 2/1972 | Hamby . | |
| 3,762,802 | 10/1973 | Allen . | |
| 3,801,187 | 4/1974 | McMichael . | |
| 3,820,877 | 6/1974 | Moyer . | |
| 4,052,124 | 10/1977 | Marcus . | |
| 4,268,120 | 5/1981 | Jitsumori | 350/623 |
| 4,558,930 | 12/1985 | Deedreck | 350/604 |

FOREIGN PATENT DOCUMENTS

| | | | |
|---|---|---|---|
| 222570 | 5/1910 | Fed. Rep. of Germany | 350/618 |
| 45167 | 7/1935 | France | 350/623 |
| 4440 | 1/1982 | Japan | 350/604 |
| 1240998 | 7/1971 | United Kingdom | 350/604 |

Primary Examiner—Jon W. Henry
Attorney, Agent, or Firm—Kenyon & Kenyon

[57] ABSTRACT

A combination forward and rearward viewing mirror assembly for automotive vehicles comprises a first body member fixed to the door of an automobile and a second body member shiftably coupled to the first body member via a linkage or lever system. The first body member is provided with a mirror which coacts with another mirror on a side of the second body member in an operative or extended configuration of the mirror assembly to provide an enhanced view to the automobile driver of objects located beyond the forward end of the automobile and, in particular, beyond a preceding vehicle. A third mirror is mounted on a side of the movable body member opposite the second mirror, the third mirror serving as a side-disposed rear view mirror. The third mirror is designed to give the operator substantially the same rearward view in both an extended and a retracted configuration of the mirror assembly.

16 Claims, 10 Drawing Figures

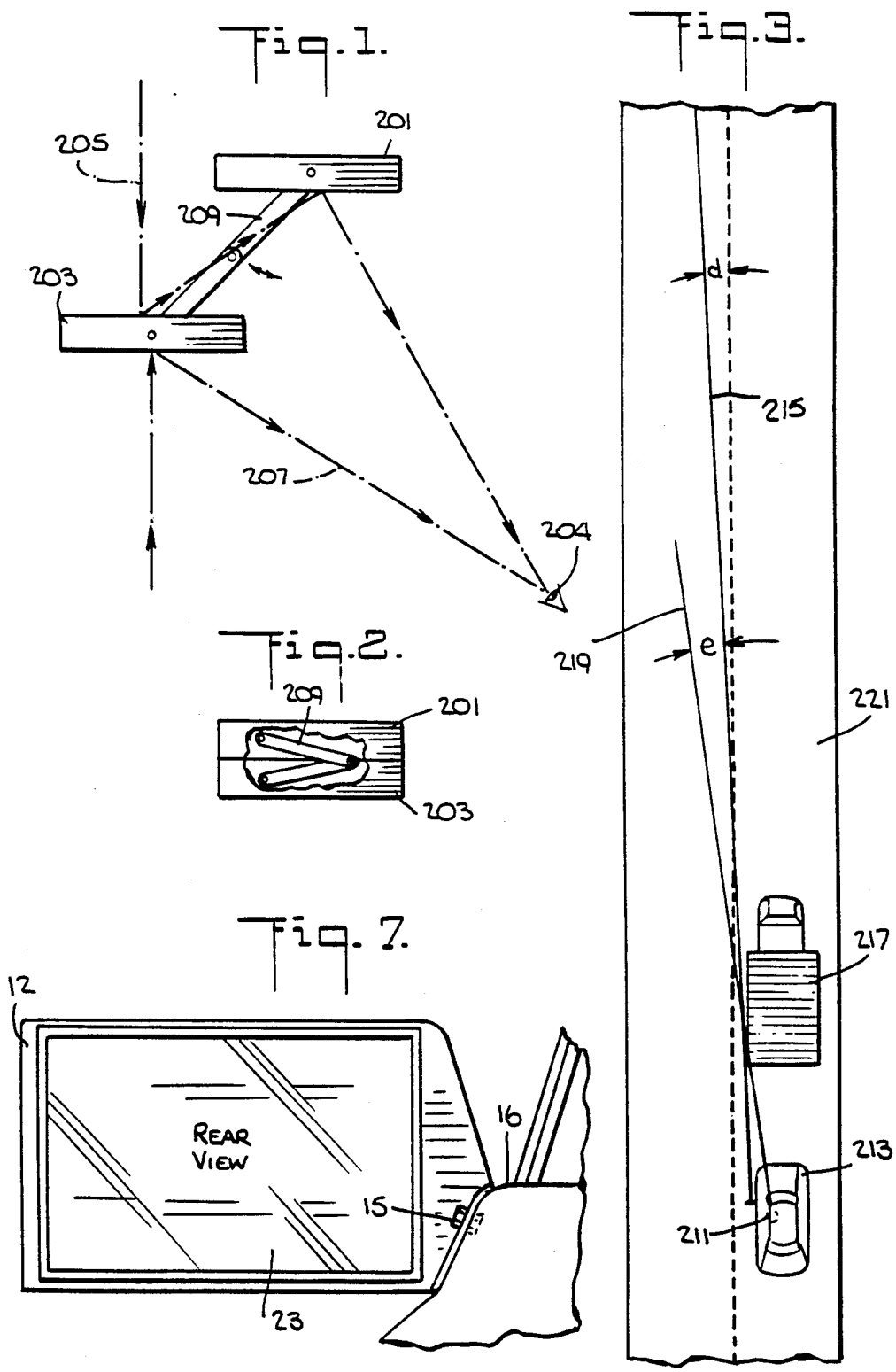

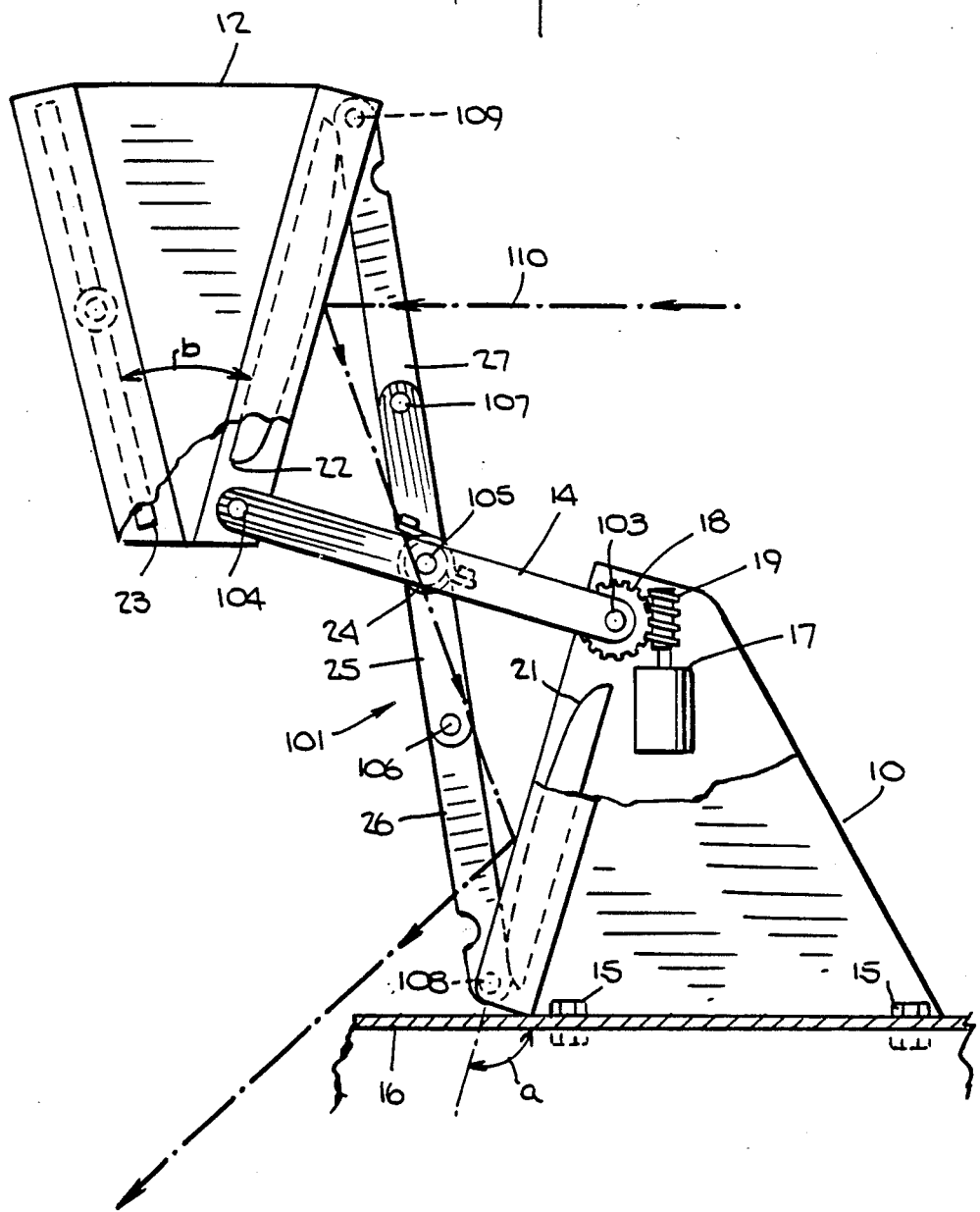

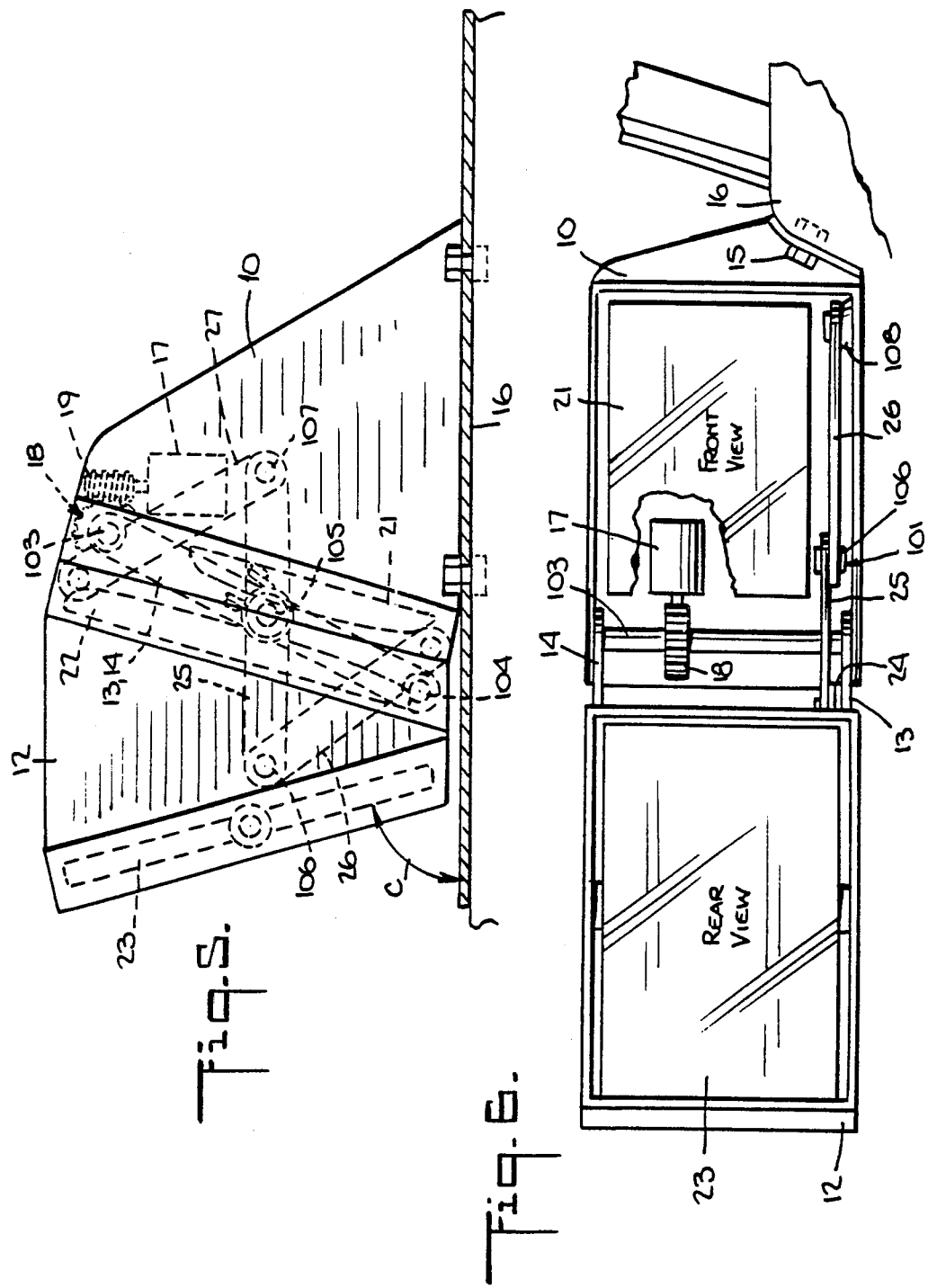

COMBINED FORWARD AND REARWARD VIEWING MIRROR ASSEMBLY FOR AUTOMOTIVE VEHICLES

BACKGROUND OF THE INVENTION

This invention relates to an assembly for extending or enhancing the visual field available to the driver of an automotive vehicle. More particularly, this invention relates to a combined forward and rearward viewing mirror assembly on an automotive vehicle.

It is well known that safe driving of an automotive vehicle requires that the operator have an adequate view of objects to the rear of, alongside and forward of the vehicle. Many devices have been proposed and constructed for enhancing the visual field available to automobile drivers. For example, U.S. Pat. No. 2,191,558 discloses a mirror assembly disposable at the top of a hill or at a bend in a road to provide the driver of an oncoming vehicle with an unobstructed view of vehicles on the other side of the hill or the curve. U.S. Pat. No. 2,398,354 shows and describes a periscope installable in the top of automobile for giving the driver thereof a clear view of objects immediately to the side of the automobile and immediately rearwardly thereof exemplarily for facilitating parking of the vehicle along a curb. To a similar end, U.S. Pat. No. 2,374,956 discloses a system of mirrors positioned at different points within the passenger compartment of an automobile for giving the driver thereof of an improved view of areas immediately forward and immediately rearward, and to the side, of the vehicle.

In some proposed devices for enhancing the visual field available to an automobile driver, a mirror is shiftably mounted to the automobile. For example, U.S. Pat. No. 2,607,273 is directed to a two sided mirror installable beneath the hood of an automobile, a mechanism being provided for raising the mirror vertically out of the hood so that the driver of the car may see objects to the left or right thereof by looking at the mirror. U.S. Pat. No. 3,820,877 discloses a rear view mirror attached to an automobile by means of an extendable arm to enhance visibility to the rear of the automobile. Another mirror system with movable components, disclosed in U.S. Pat. No. 3,801,187, includes a pair of mirrors mounted at opposite ends of a telescoping cylinder 9 assembly. In this assembly, the cylinders are rotatable with respect to one another so that the mirrors can be used to alternately obtain a better rearward view and a better forward view from the vehicle to which the assembly is mounted.

One situation in which an improved field of view is important, if not critical, to highway safety is the passing situation. Frequently, in order to obtain a line of sight which extends sufficiently beyond the vehicle or vehicles to be passed to determine whether a safe passing is possible, it is necessary for the driver of the passing automobile to edge into the lane of oncoming traffic. This necessity arises, for example, if the vehicle immediately in front of the passing automobile is a large truck. A mirror assembly for improving the line of sight in such a situation, set forth in U.S. Pat. No. 1,877,109, comprises a pair of mirrors secured to the body of a vehicle and fixed in a periscopic relationship with respect to one another to enable the driver of the vehicle to view oncoming vehicles on the left hand side of the highway.

An object of the present invention is to provide an improved mirror assembly attachable to an automobile for providing the driver thereof with an enhanced visual field.

Another, more particular, object of the present invention is to provide such a mirror assembly which gives the driver of an automobile an improved line of sight with respect to oncoming vehicles, while maintaining a view of objects to the rear of the automobile.

Another particular object of the present invention is to provide such a mirror assembly which minimizes air resistance or drag particularly when the driver is not attempting to pass other vehicles.

Yet another particular object of the present invention is to provide a combination forward and rearward viewing mirror assembly in which the forward viewing function is selectively operable or usable, e.g., in a passing situation.

SUMMARY OF THE INVENTION

In accordance with the present invention, an assembly for extending a visual field available to a driver of an automotive vehicle comprises a first reflector for providing the driver with a view of objects towards and beyond a rear end of the vehicle and a second reflector having an operative configuration for providing the driver with an enhanced view of objects beyond a forward end of the vehicle. A carrier is movably attached to the vehicle for supporting the second reflector in a plurality of alternative configurations including the operative configuration and a storage configuration. The first reflector is supported by the carrier so that the first reflector assumes different positions each corresponding to a respective configuration of the second reflector. The first reflector is so oriented in each of the different positions that the driver may use the first reflector in each of those positions to obtain a substantially common view of objects towards and beyond the rear end of the vehicle. An actuator mechanism is operatively linked to the carrier for shifting the second reflector to the storage configuration from the operative configuration and alternately to the operative configuration from the storage configuration.

In accordance with particular features of the present invention, the second reflector includes two mirrors and the operative configuration of the second reflector is a periscopic configuration of the two mirrors. One of the two mirrors is preferably fixed relative to a body component of the vehicle, while the other of the two mirrors is shiftable relative to that body component. The two mirrors are advantageously juxtaposed to one another in the storage configuration of the second reflector and spaced from one another in the operative configuration.

In accordance with another feature of the present invention, the fixed mirror is mounted to a first body member in turn attached to an outer surface of the vehicle, while the movable mirror is mounted to a second body member supported on the first body member and shiftable from a retracted position adjacent to the first body member (the storage or closed configuration of the second reflector) to an extended position remote from the first body member (the operative configuration). The movable mirror is mounted on a first side of the second body member, while the first reflector is placed on a second side of the second body member substantially opposed to the first side. As set forth above, the first reflector is viewable both in the retracted position and the extended position of the second body member by a driver of the vehicle for enabling the monitoring of objects towards and beyond a rear end of the vehicle.

A vehicle mirror assembly in accordance with the present invention provides a driver with an enhanced forward field of view for facilitating the safe passing of other vehicles while maintaining for the driver substantially the same rearward view of objects along the side of, towards and beyond the rear end the driver's automobile. Because the body supporting the movable mirrors is alternately extendable and retractable at will, the forward viewing function of the mirror assembly can be made available only when needed. Moreover, the use of the retracted or storage configuration reduces the amount of drag on the automobile and prevents insects such as mosquitos from being splattered on the surface of the forward facing mirror.

BRIEF DESCRIPTION OF THE DRAWING

FIG. 1 is a diagram of a combination forward and rearward viewing mirror assembly in an extended configuration, schematically illustrating a principle of the present invention.

FIG. 2 is a diagram of the mirror assembly of FIG. 1 in a closed or retracted configuration.

FIG. 3 is a diagram showing use of the mirror assembly of FIG. 1.

FIG. 4 is a top view, partially broken away, of a combination forward and rearward viewing mirror assembly in accordance with the present invention, showing the assembly in an extended or operative configuration.

FIG. 5 is a top view of the assembly of FIG. 4, showing the assembly in a retracted or storage configuration.

FIG. 6 is a rear elevational view of the assembly of FIG. 4, taken from the left hand side of that figure.

FIG. 7 is a rear view of the assembly shown in FIG. 5, taken from the left hand side of that figure.

DETAILED DESCRIPTION

Figure 8:
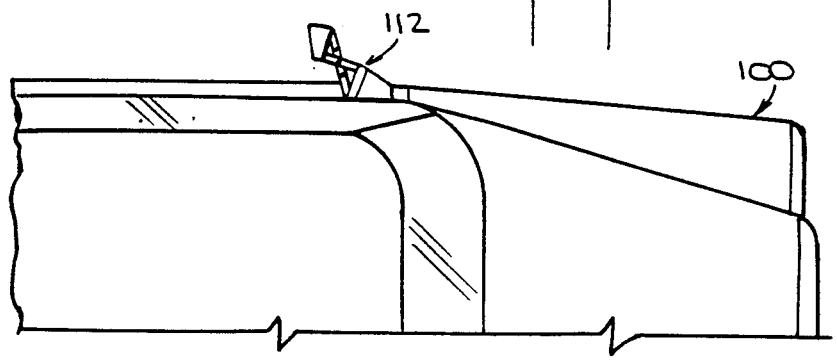
FIG. 8 is partial top view of an automobile provided with a combination forward and rearward viewing mirror assembly in accordance with the present invention, the assembly being shown in the extended or operative configuration.

As illustrated in FIGS. 1 and 2, a combination rearward and forward viewing mirror in accordance with the invention comprises two mirror-supporting bodies 201 and 203 having an open or separated configuration (FIG. 1) for enabling both rearward viewing and enhanced forward viewing and a closed configuration (FIG. 2) in which rearward viewing alone is possible. In the open configuration, the mirrors are positioned in such a manner that the eye 204 of an automobile driver sitting in a vehicle to which the mirror assembly is attached receives both incoming light rays 205 from ahead of the vehicle and incoming light rays 207 from behind or along side the vehicle.

Mirror-supporting bodies 201 and 203 are connected to one another by a linkage system 209 which has an extended configuration shown in FIG. 1 and a folded or retracted configuration shown in FIG. 2.

As illustrated schematically in FIG. 3, the driver 211 of an automobile 213 having the mirror assembly of FIGS. 1 and 2 is provided, when the mirror assembly is open or extended, with an enhanced forward field of view represented by a sight line 215 extending past a truck 217 ahead of automobile 213. This sight line has a smaller angle d than the angle e of a normal sight line 219 with respect to the direction of a road 221 on which automobile 213 and truck 217 are travelling.

In an embodiment of the invention illustrated in FIGS. 4 and 5, a combination forward and rearward viewing mirror assembly for extending or enhancing a visual field available to a driver of an automotive vehicle comprises a first body member 10 attachable by means of bolts 15 to an outer surface of an automobile body component such as a car door 16. The mirror assembly further comprises a second body member 12 movably coupled to first body member 10 by a pair of parallel links 13 and 14 each swingably connected at one end via a shaft 103 to body member 10 and swingably coupled at an opposite end via another shaft 104 (or respective pivot pins) to body member 12.

Link 13 forms part of a linkage or lever system 101. Also included in lever system 101 is another link 25 rotatably secured to a central portion of link 13 via a pivot pin 105. Link 25 is pivotably secured at opposite ends to a pair of lever arms 26 and 27 via respective pins 106 and 107. Lever arms 26 and 27 in turn are rotatably connected at ends opposite pins 106 and 107 to body members 10 and 12 via coupling lugs 108 and 109.

Links 13 and 14 are rigid with shaft 103 which in turn is rigid with a toothed gear 18 having teeth meshing with the thread of a worm gear 19. Worm gear 19 is fixed to the output shaft of a small electric motor 17 disposed within body member 10. Leads (not illustrated) for conducting electric power to motor 17 extend to the motor from the door or control panel of the automotive vehicle.

Worm gear 19 is rotatable by motor 17 alternately in opposite directions. Upon rotation of worm gear 19 in one direction, toothed gear 18, shaft 103 and links 13 and 14 are caused to pivot in a clockwise direction (as seen in FIGS. 4 and 5) about the axis of symmetry of shaft 103, whereby body member 12 is shifted from a retracted position illustrated in FIG. 5 to an extended position illustrated in FIG. 4. Upon rotation of worm gear 19 in an opposite direction, toothed gear 18, shaft 103 and links 13 and 14 rotate in a counterclockwise direction about the axis of symmetry of shaft 103, thereby shifting body member 12 from the extended position of FIG. 4 to the retracted position of FIG. 5.

During an extension motion of body 12, lever arms 26 and 27 both swing in a clockwise direction (as defined in FIGS. 4 and 5) about respective pivot lugs 108 and 109. The direction of rotation of these lever arms is reversed during a retraction stroke of body member 12.

As illustrated in FIGS. 4–7, a first mirror 21 is mounted to body member 10 on the same side of that body member as links 13 and 14. Mirror 21 is oriented at an obtuse angle a with respect to car door 16. Two additional mirrors 22 and 23 are mounted on substantially opposite sides of body member 12, mirrors 22 and 23 being oriented at an acute angle b with respect to one another.

Mirrors 21 and 22 form a reflector system operative, in the extended or periscopic configuration shown in FIG. 4, to direct incoming rays beams 110 towards the eyes of an automobile driver (e.g., eye 211 in FIG. 3). The periscopic action of mirrors or reflectors 21 and 22 give the driver of the automobile an enhanced line of sight which may extend appreciably beyond a preceding vehicle (e.g., truck 217 in FIG. 3), thereby giving the driver more visual information upon which to decide whether to pass the preceding vehicle. In the extended or operative configuration of mirrors 21 and 22, link 25 and lever arms 26 and 27 are preferably disposed in a linear arrangement, as illustrated in FIG. 4. Lever system 101 is provided with a spring 24 arranged to exert pressure on link 25 to ensure that this link will rotate in the proper direction when drive motor 17 is reversed. In addition, lever system 101 may be provided with stops (not illustrated) for preventing clockwise rotation of lever arms 26 and 27 about pivot lugs 108 and 109 and of link 13 about the axis of shaft 103 beyond the positions shown in FIG. 4.

Mirror 23 serves as a side-disposed rearward viewing mirror for providing to the automobile driver a view of objects alongside and towards and beyond the rear end of the automobile. Accordingly, mirror 23 is inclined at an acute angle c with respect automobile door 16. Lever system 101 and link 14 are so designed that rearward viewing mirror 23 retains substantially the same orientation both in the retracted or storage configuration (FIG. 5) and the operative configuration (FIG. 4) of the mirror assembly, as well as in intervening configurations, whereby the view of the driver towards the rear end of the vehicle is not lost while the mirror assembly is operating to give the driver a periscopically enhanced view of objects beyond the front end of the vehicle.

As illustrated in FIG. 5, mirrors 21 and 22 are juxtaposed to one another in the retracted or inoperative configuration of the assembly. In addition, body members 10 and 12 are preferably provided with slots or recesses (not illustrated) for receiving links 13, 14 and 25 and lever arms 26 and 27 during a closing or retraction operation. As illustrated in FIG. 5, link 25 and lever arms 26 and 27 advantageously assume a Z-shaped folded arrangement in the retracted or storage configuration of the mirror assembly.

Figure 9:
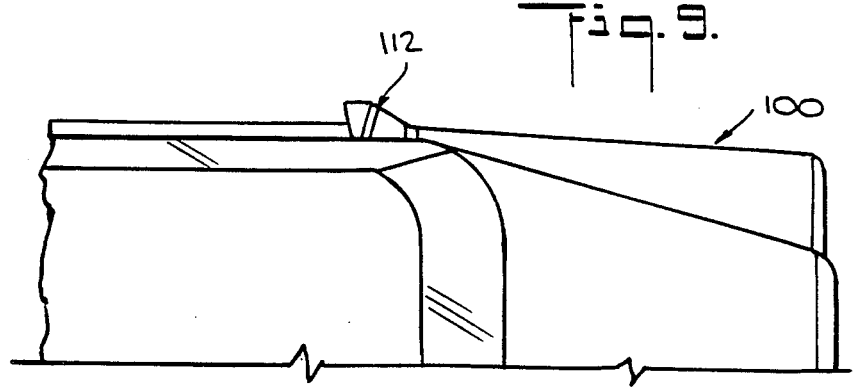
FIG. 9 is a top view similar to FIG. 8, showing the mirror assembly in the retracted or storage configuration.
Figure 10:
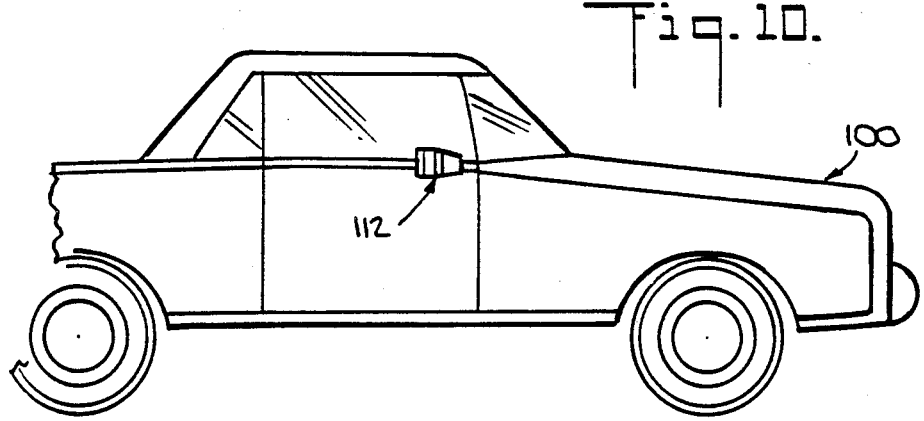
FIG. 10 is a partial side elevational view of an automobile equipped with a mirror assembly in accordance with the present invention.

FIGS. 8 and 9 show a mirror assembly 112 in accordance with the present invention mounted to the side of automobile 100. The mirror assembly may have a symmetrical design, whereby the assembly 112 may be attached to the right side, as illustrated in FIG. 10, as well as to the left side, of automobile 100.

Mirrors 21, 22 and 23 are preferably planar but may alternatively assume arcuate, e.g., convex, shapes.

Means may be provided for automatically de-energizing motor 17 upon the completion of an extension stroke and of a retraction stroke of body member 12. Such de-energization means may take any one of a number of different forms known to those of skill in the art. It is to be noted, in addition, that the power for the extension and retraction strokes of body 12 may be provided by means other than electric motor 17, for example, by pneumatic or hydraulic drives (not shown).

Mirror 21 and/or 22 may be movably mounted within the respective body member in order to adjust the field of view available to the driver. An actuator (not illustrated) for accomplishing the adjustment may be located within the passenger compartment of the automotive vehicle, whereby adjustments may be effectuated during operation of the vehicle.

Although the invention has been described in terms of particular embodiments and applications, one of ordinary skill in the art, in light of this teaching, may generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A combination forward and rearward viewing mirror assembly for an automotive vehicle, comprising:
   a first body attachable to an outer surface of the vehicle;
   a first mirror mounted to said first body;
   a second body;
   coupling means including a lever system connected to said first body and to said second body for supporting said second body on said first body and for shifting said second body from a retracted position adjacent to said first body to an extended position remote from said first body;
   a second mirror on a first side of said second body, said first mirror and said second mirror having relative positions and orientations in said extended position of said second body so that an operator of said vehicle looking at said first mirror can obtain via said first mirror and said second mirror an enhanced view of objects forward of said vehicle; and
   a third mirror on a second side of said second body substantially opposed to said first side, said third mirror being viewable both in said retracted position and said extended position of said second body by an operator of said vehicle for enabling monitoring of objects towards and beyond a rear end of said vehicle.

2. An assembly according to claim 1 wherein said second mirror is juxtaposed to said first mirror in said retracted position of said second body.

3. An assembly according to claim 1 wherein said coupling means includes drive means for shifting said second body alternately from said retracted position to said extended position and from said extended position to said retracted position.

4. An assembly according to claim 1 wherein said third mirror has, in said extended position of said second body, an orientation substantially parallel to an orientation of said third mirror in said retracted position of said second body.

5. An assembly according to claim 1 wherein said second mirror has, in said extended position of said second body, an orientation substantially parallel to an orientation of said second mirror in said retracted position of said second body.

6. An assembly according to claim 1 wherein said first mirror and second mirror have orientations substantially parallel to one another in said retracted position of said second body.

7. An assembly according to claim 1 wherein said first mirror and second mirror have orientations substantially parallel to one another in said extended position of said second body.

8. An assembly according to claim 1 wherein said third mirror is oriented at an acute angle with respect to said second mirror.

9. A combination forward and rearward view mirror assembly for an automotive vehicle, comprising:

a first body attachable to an outer surface of the vehicle;

a first mirror mounted to said first body;

a second body;

coupling means including a lever system connected to said first body and to said second body for supporting said second body on said first body and for shifting said second body from a retracted position adjacent to said first body to an extended position remote from said first body;

a second mirror on a first side of said second body, said second mirror being juxtaposed to said first mirror in said retracted position of said second body, said first mirror and said second mirror having relative positions and orientations in said extended position of said second body so that an operator of said vehicle looking at said first mirror can obtain via said first mirror and said second mirror an enhanced view of objects forward of said vehicle; and a third mirror on a second side of said second body substantially opposed to said first side, said third mirror being oriented at an acute angle with respect to said second mirror, said third mirror being viewable both in said retracted position and said extended position of said second body by an operator of said vehicle for enabling monitoring of objects towards and beyond a rear end of said vehicle.

10. An assembly for extending a visual field available to a driver of an automotive vehicle, said assembly comprising:

first reflector means for providing the driver with a view of objects towards and beyond a rear end of said vehicle;

second reflector means having an operative configuration for providing said driver with an enhanced view of objects beyond a forward end of said vehicle;

carrier means including a lever system movably attached to said vehicle for supporting said second reflector means in a plurality of alternative configurations relative to said vehicle including said operative configuration and a storage configuration, said first reflector means being supported by said carrier means so that said first reflector means assumes different positions each corresponding to a respective configuration of said second reflector means, said first reflector means being so oriented in each of said different positions that said driver may use said first reflector means in each of said different positions to obtain a substantially common view of objects towards and beyond the rear end of said vehicle; and actuator means operatively linked to said carrier means for shifting said second reflector means to said storage configuration from said operative configuration and alternately to said operative configuration from said storage configuration.

11. An assembly according to claim 10 wherein said second reflector means includes two mirrors, said operative configuration being a periscopic configuration of said two mirrors.

12. An assembly according to claim 11 wherein one of said two mirrors is translationally fixed relative to a body component of said vehicle, the other of said two mirrors being translationally shiftable relative to said body component.

13. An assembly according to claim 12 wherein said two mirrors are juxtaposed to one another in said storage configuration and spaced from one another in said operative configuration.

14. An assembly according to claim 13 wherein said first reflector means includes a side-disposed rear view mirror having, in said operative configuration of said second reflector means, an orientation substantially parallel to an orientation of said rear view mirror in said storage configuration of said second reflector means.

15. An assembly according to claim 14 wherein said other of said two mirrors has, in said operative configuration of said second reflector means, an orientation substantially parallel to an orientation of said other of said two mirrors in said storage configuration of said second reflector means.

16. An assembly according to claim 15 wherein said other of said two mirrors is fixed at an acute angle with respect to said rear view mirror.

* * * * *

UNITED STATES PATENT AND TRADEMARK OFFICE
CERTIFICATE OF CORRECTION

PATENT NO. : 4,685,779

DATED : August 11, 1987

INVENTOR(S) : Sergio Gonzalez

It is certified that error appears in the above-identified patent and that said Letters Patent is hereby corrected as shown below:

Column 1, line 23, change "of automobile" to --of an automobile--; line 30, delete "of" (first occurrence); line 47, delete "9".
    Column 3, line 44, change "tion. the" to --tion, the--; line 66, change "along side" to --alongside--.
    Column 5, line 1, insert --or-- after "rays"; line 24, insert --to-- after "respect".

Signed and Sealed this

Twenty-ninth Day of December, 1987

*Attest:*

DONALD J. QUIGG

*Attesting Officer*    *Commissioner of Patents and Trademarks*